(12) United States Patent
Byun et al.

(10) Patent No.: US 10,764,917 B2
(45) Date of Patent: Sep. 1, 2020

(54) METHOD AND APPARATUS FOR TRANSMITTING SCHEDULING REQUEST IN WIRELESS COMMUNICATION SYSTEM

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Jiwon Kang, Seoul (KR); Heejin Kim, Seoul (KR); Hyunjin Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 16/301,722

(22) PCT Filed: May 17, 2017

(86) PCT No.: PCT/KR2017/005098
§ 371 (c)(1),
(2) Date: Nov. 14, 2018

(87) PCT Pub. No.: WO2017/209416
PCT Pub. Date: Dec. 7, 2017

(65) Prior Publication Data
US 2019/0223202 A1 Jul. 18, 2019

Related U.S. Application Data

(60) Provisional application No. 62/344,980, filed on Jun. 2, 2016.

(51) Int. Cl.
*H04W 72/12* (2009.01)
*H04W 72/04* (2009.01)
*H04W 74/08* (2009.01)

(52) U.S. Cl.
CPC ..... *H04W 72/1284* (2013.01); *H04W 72/042* (2013.01); *H04W 72/0413* (2013.01); *H04W 72/0446* (2013.01); *H04W 74/0891* (2013.01)

(58) Field of Classification Search
CPC ........... H04W 72/1284; H04W 72/042; H04W 72/0413; H04W 72/0446; H04W 74/0891
See application file for complete search history.

(56) References Cited

U.S. PATENT DOCUMENTS 8,804,756 B2 * 8/2014 Tseng ................. H04L 1/08
370/329
2010/0074231 A1 3/2010 Hsu
(Continued)

FOREIGN PATENT DOCUMENTS

KR 1020150016473 2/2015

OTHER PUBLICATIONS

PCT International Application No. PCT/KR2014/005057, International Search Report dated Feb. 28, 2014, 3 pages.

*Primary Examiner* — Christopher P Grey
(74) *Attorney, Agent, or Firm* — Lee Hong Degerman Kang Waimey

(57) ABSTRACT

Provided are a method and an apparatus for transmitting a scheduling request in a wireless communication system. Particularly, a terminal receives, from a base station, allocation information for an SR resource and allocation information for an SPS resource. The terminal transmits a scheduling request through the SR resource or the SPS resource. The allocation information for the SR resource indicates that the SR resource is allocated to a first period. The allocation information for the SPS resource indicates that the SPS resource is allocated to a second period. When the scheduling request is transmitted through the SPS resource, the (Continued)

scheduling request is not transmitted through a predetermined plurality of subframes including the SPS resource.

10 Claims, 15 Drawing Sheets

(56) References Cited

U.S. PATENT DOCUMENTS

| | | | |
|---|---|---|---|
| 2010/0279695 A1* | 11/2010 | Amirijoo | H04W 36/0055 |
| | | | 455/438 |
| 2012/0190376 A1 | 7/2012 | Rosa et al. | |
| 2013/0194908 A1* | 8/2013 | Gao | H04L 5/0091 |
| | | | 370/203 |
| 2013/0301446 A1* | 11/2013 | Chen | H04W 72/0413 |
| | | | 370/252 |
| 2015/0049678 A1 | 2/2015 | Speight | |
| 2016/0080133 A1* | 3/2016 | Golitschek Edler Von Elbwart | H04W 72/0446 |
| | | | 370/280 |
| 2017/0134236 A1* | 5/2017 | Patel | H04W 74/004 |
| 2019/0223202 A1* | 7/2019 | Byun | H04W 72/1284 |

* cited by examiner

METHOD AND APPARATUS FOR TRANSMITTING SCHEDULING REQUEST IN WIRELESS COMMUNICATION SYSTEM

CROSS-REFERENCE TO RELATED APPLICATIONS

This application is the National Stage filing under 35 U.S.C. 371 of International Application No. PCT/KR2017/005098, filed on May 17, 2017, which claims the benefit of U.S. Provisional Application No. 62/344,980, filed on Jun. 2, 2016, the contents of which are all hereby incorporated by reference herein in their entirety.

BACKGROUND OF THE INVENTION

Field of the Invention

This specification relates to wireless communication and, most particularly, to a method for transmitting a scheduling request in a wireless communication system and an apparatus using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a $3^{rd}$ generation partnership project (3GPP) long term evolution (LTE) system, a user equipment (UE) in an idle state must perform an RRC connection setup and a data connection setup before data transmission is performed. This means that both of a logical connection (RRC connection) between a base station (BS) and the UE and a logical connection (S1 connection/interface, EPS connection) between a mobility management entity (MME) and the UE are set up. Therefore, in order for the UE to perform data transmission, it takes an additional time corresponding to a time required to perform the connection setup. However, when the UE transmits or receives large-sized data once or twice, it is ineffective to perform the connection setup. Accordingly, a connectionless transmission method may be considered to solve this problem.

SUMMARY OF THE INVENTION

Technical Objects

This specification provides a method and apparatus for transmitting a scheduling request in a wireless communication system.

Technical Solutions

This specification proposes a method and apparatus for transmitting a scheduling request in a wireless communication system. The apparatus may correspond to a user equipment (UE). The apparatus includes a radio frequency (RF) unit transmitting and receiving radio signals, and a processor being operatively connected to the RF unit.

Firstly, the terms will be defined. A scheduling request (SR) resource may correspond to a resource for a scheduling request that is being allocated within a control channel (e.g., PUCCH). Although a semi-persistent scheduling (SPS) resource corresponds to a resource for transmitting uplink data, among the SPS resources, part of the resources may be allocated as resources for the scheduling request.

The UE receives allocation information of a scheduling request (SR) resource and allocation information of a semi-persistent scheduling (SPS) resource. At this point, the allocation information of the SR resource indicates that the SR resource is allocated at a first cycle period. And, the allocation information of the SPS resource indicates that the SPS resource is allocated at a second cycle period.

However, the SR resource and the SPS resource may correspond physical resources or logical resources. In light of the physical resource, if the scheduling request is transmitted through the SPS resource, based on the SPS resource, the SR resource is not allocated starting from a preceding predetermined subframe to a following predetermined subframe. A number of preceding predetermined subframes and a number of following predetermined subframes may be assigned with integer values being equal to or greater than 0. In other words, if the scheduling request is transmitted through the SPS resource, the scheduling request is not transmitted through a plurality of predetermined subframes including the SPS resource.

However, the first cycle period and the second cycle period may correspond to concepts that are applied to the logical resource. More specifically, the UE may receive a cyclic shift index from the base station. At this point, the SR resource may be cyclically shifted and allocated to the UE based on the cyclic shift index. Additionally, the UE may receive information on the size of the cyclically shifting logical resource group.

The cyclic shift index may be determined based on the position of a SR resource from which the scheduling request is transmitted for the first time since the SPS resource from which the scheduling request is transmitted.

For example, a case where the number of UEs being allocated with the scheduling request resources by the base station is equal to M may be assumed herein. At this point, the second cycle period may be equal to M times the first cycle period. The SR resource may be configured of M−1 number of logical resources. Additionally, the M−1 number of logical resources may be cyclically shifted so as to be allocated to M number of UEs based on the cyclic shift index. At this point, the value M may be an integer equal to or greater than 1.

Additionally, the UE may receive an indicator indicating the deactivation or activation of the SPS resource. If the indicator indicates the deactivation of the SPS resource, the UE may receive allocation information of the SR resource, which is to be used during a deactivation duration of the SPS resource, from the base station. The SR resource, which is allocated at this point, may correspond to a resource that is to be temporarily used by the UE and not to a dedicated resource, which is only used by a specific UE. In this case, the base station may allocate only a single SR resource to the UE, or the base station may allocate a plurality of SR resources to the UE. In case the UE is allocated with a plurality of SR resources, the UE performs the scheduling request by randomly selecting one resource. More specifically, the SR resource, which is to be used during the deactivation duration of the SPS resource, may correspond to one of the M−1 number of logical resources.

Additionally, the UE may receive application time information of the cyclic shift index from the base station at the second cycle period. In this case, the cyclic shift index may be applied starting from after the subframe that is indicated by the application time information.

Furthermore, the SR resource may be replaced with a random access resource. More specifically, the SR resource may be used to enable the UE to transmit a random access preamble. Since the random access resource is commonly shared by the UEs existing within the cell, the base station is required to allocate the position of the SPS resource in accordance with the position of the random access resource. Therefore, the SPs resource may be allocated based on the position of the SR resource and the first cycle period.

The UE may transmit a scheduling request to the base station through the SR resource or the SPS resource. More specifically, the UE may perform a scheduling request through the SR resource of the control channel at the first cycle period. And, if the UE transmits a scheduling request through the SPS resource, which is allocated at the second cycle period, the UE may not use the SR resource, which is allocated at the first cycle period.

Effects of the Invention

When using the proposed technique, by using a scheduling request resource within an SPS resource for uplink data transmission and a scheduling request of a control channel, a required low latency condition for a scheduling request may be satisfied even though a smaller amount of scheduling request resource of the control channel is used as compared to the conventional (or legacy) method.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
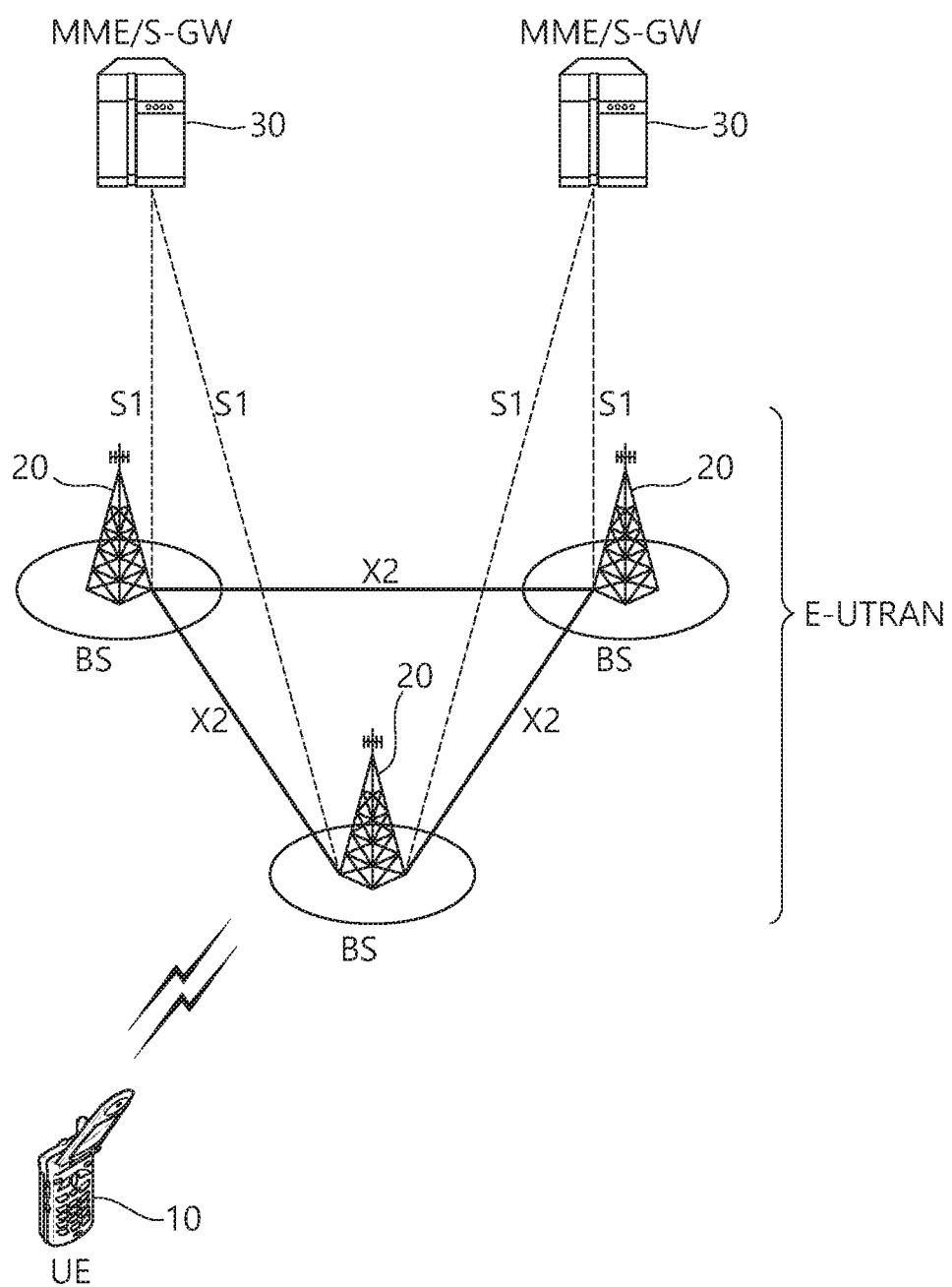
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, etc. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
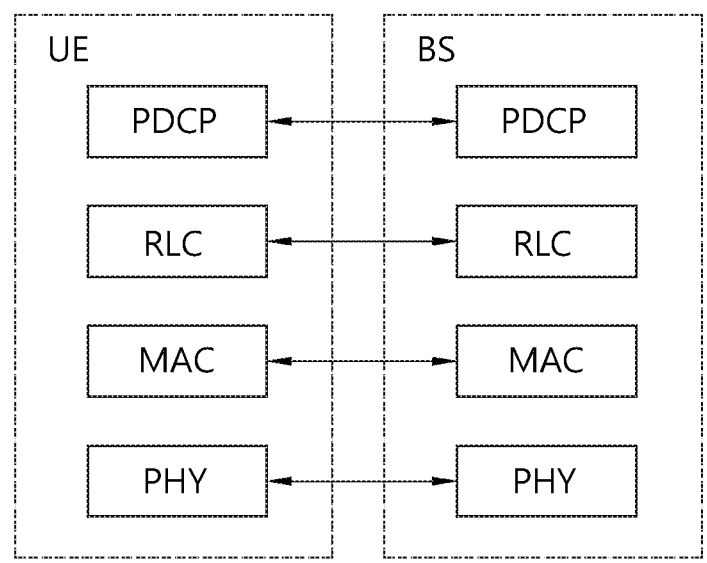
FIG. 2 is a diagram illustrating a radio protocol architecture for a user plane.
Figure 3:
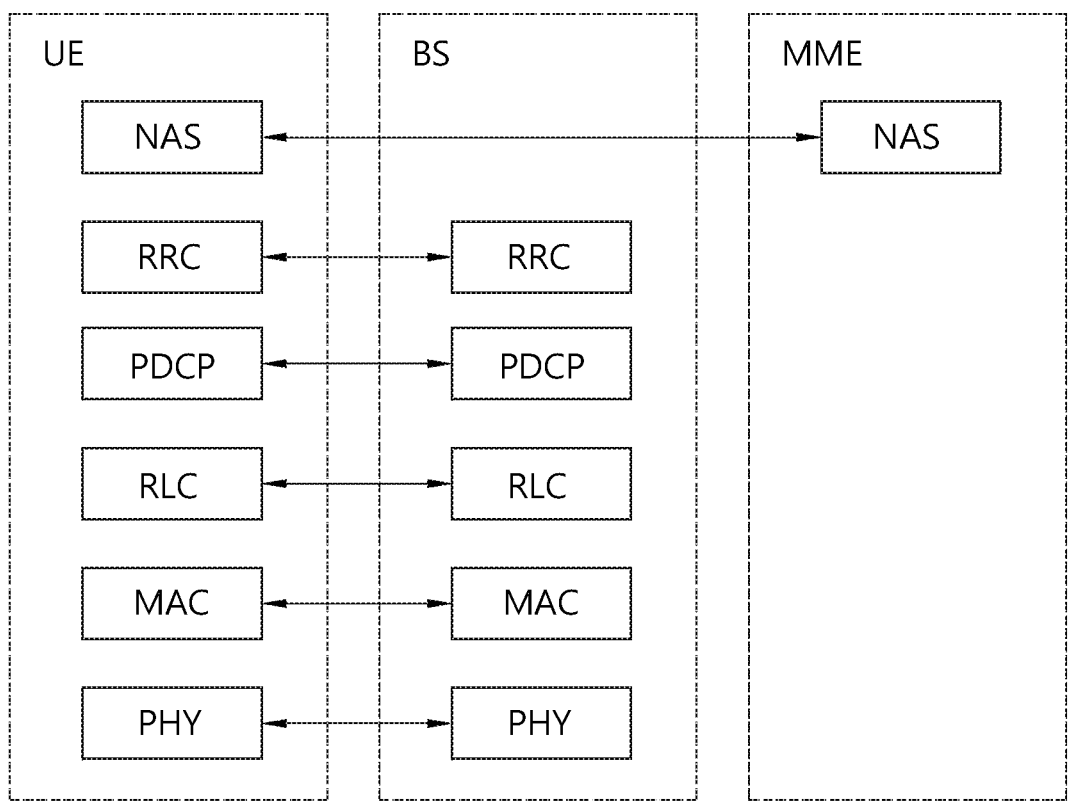
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
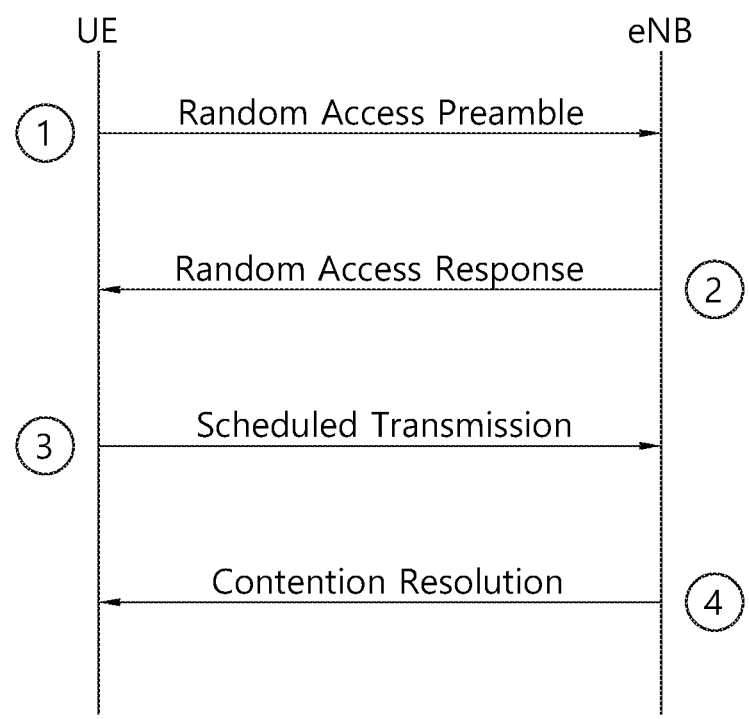
FIG. 4 shows a process of an operation performed between a user equipment (UE) and an eNodeB (eNB) in a contention-based random access procedure.

FIG. 4 shows a process of an operation performed between a UE and an eNB in a contention-based random access procedure.

First, in the contention-based random access, the UE may randomly select a random access preamble in a group of random access preambles indicated through system information or a handover command, may select a PRACH resource capable of transmitting the random access preamble, and may subsequently transmit the selected random access preamble to the eNB (step 1).

After transmitting the random access preamble, the UE may attempt to receive a response for the random access preamble in a random access response reception window indicated through the handover command (step 2). More particularly, the random access information may be transmitted in a form of a MAC PDU, and the MAC PDU may be transmitted on a physical downlink shared channel (PDSCH). Further, a physical downlink control channel (PDCCH) is transmitted so that the UE can properly receive information transmitted on the PDSCH. That is, the PDCCH includes information regarding a UE for receiving the PDSCH, frequency and time information of radio resources of the PDSCH, a transmission format of the PDSCH, or the like. Herein, if the PDCCH is successfully received, the UE may properly receive a random access response transmitted on the PDSCH according to information of the PDCCH. The random access response may include a random access preamble identifier (ID), an uplink (UL) grant, a temporary C-RNTI, a time alignment command (TAC), or the like. Herein, the random access preamble ID is included in the random access response. This is to inform the UE about which information is information regarding a UL grant, a temporary C-RNTI, a time alignment command among valid (available) information. As such, the random access preamble ID is necessary since one random access response may include random access information for one or more UEs. Herein, the random access preamble ID may be the same as a random access preamble selected by the UE in the step 1.

When the UE receives a random access response which is valid for the UE, the UE may process information included in the random access response. That is, the UE stores the temporary C-RNTI. In addition, the UE uses a UL grant to transmit data stored in a buffer of the UE to the eNB or to transmit newly generated data to the eNB (step 3). Herein, a UE identifier must be necessarily included in data included in the UL grant (message 3). The reason above is that, in the contention-based random access procedure, the eNB cannot determine which UEs perform the random access procedure, and the UEs must be identified for contention resolution at a later time. Herein, in order to include the UE identifier, two different methods may be provided. A first method is for transmitting a cell identifier of the UE through a UL grant as to whether the UE has already received a valid cell identifier assigned in a corresponding cell before the random access procedure. On the contrary, a second method is for transmitting a unique ID of the UE if the UE does not receive the valid cell ID before the random access procedure. In general, the unique identifier of the UE is longer than the cell identifier. If the UE has already transmitted data through the UL grant in step 3, the UE starts a contention resolution timer.

After data is transmitted together with an identifier through the UL grant included in the random access response, the UE waits for an indication or instruction of an eNB for the contention resolution. That is, the UE attempts a reception of a PDCCH to receive a specific message (step 4). Herein, two methods are present to receive the PDCCH. As described above, if the UE identifier transmitted through the UL grant is a cell identifier, the UE attempts a reception of the PDCCH by using a cell identifier of the UE. If the UE identifier transmitted through the UL grant is a unique identifier of the UE, the UE attempts a reception of the PDCCH by using a temporary C-RNTI included in the random access response. Thereafter, in the former case, if the PDCCH (message 4) is received through the cell identifier before the contention resolution timer expires, the UE determines that the random access procedure is successfully performed, and finishes the random access procedure. In the latter case, if the PDCCH is received through the temporary cell identifier before the contention resolution timer expires, the UE checks data (message 4) transmitted by a PDSCH indicated by the PDCCH. If the unique identifier of the UE is included in the data, the UE determines that the random access procedure is successfully performed, and finishes the random access procedure.

Hereinafter, semi-persistent scheduling (SPS) is described.

In a next-generation communication system, the SPS is required for a plurality of UEs. An Internet of Things (IoT) service of various industries is expected to be introduced in the next-generation communication system. Representative examples thereof include an automobile, a drone, or the like.

In these services, location information is expected to be updated in unit of 100 millisecond (ms) to 1 second (s) to manage autonomous driving and to prevent accidents. When the location information is updated periodically, the SPS is applied in general to decrease an overhead of an unnecessary control channel.

Figure 5:
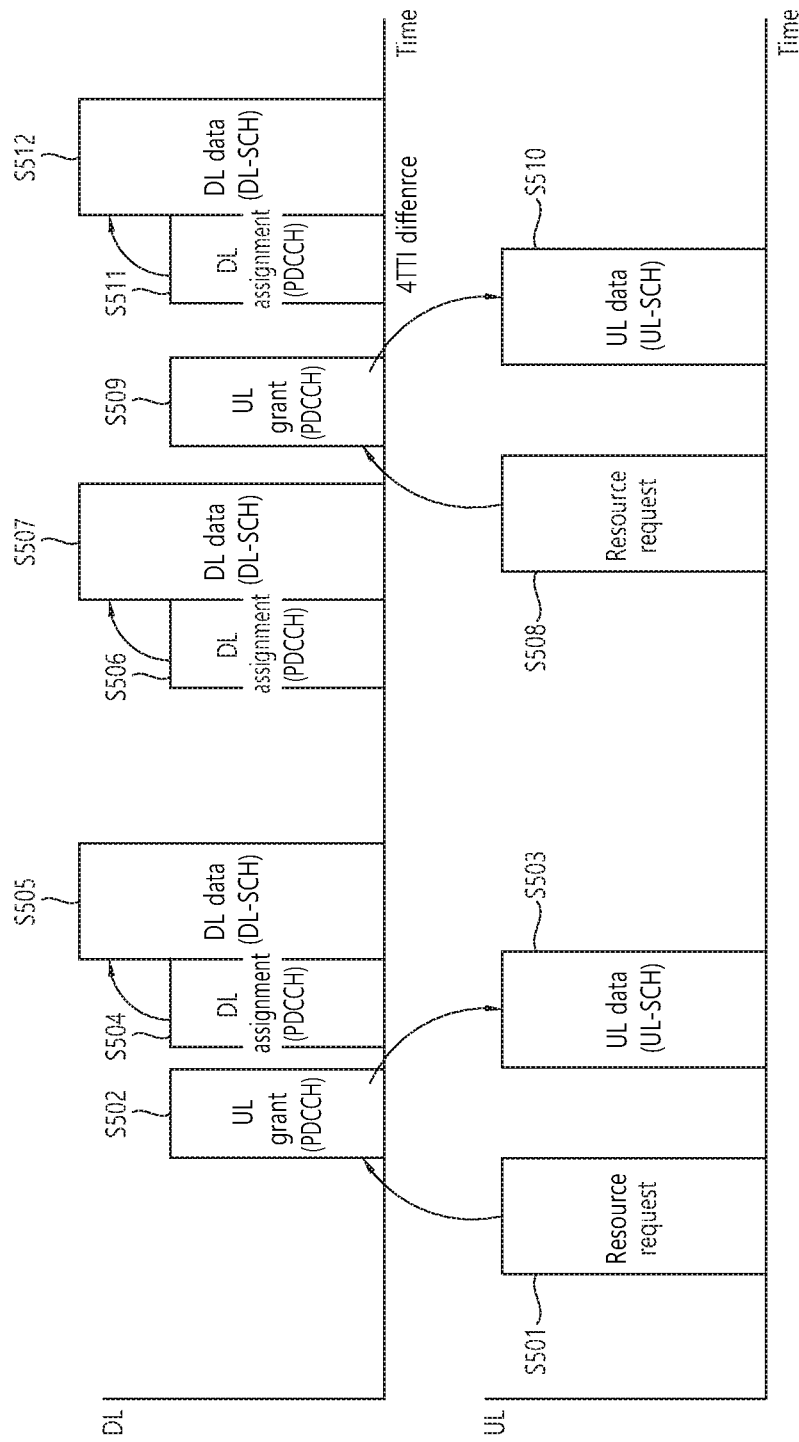
FIG. 5 is a drawing for explaining a method of dynamically assigning a radio resource.
Figure 6:
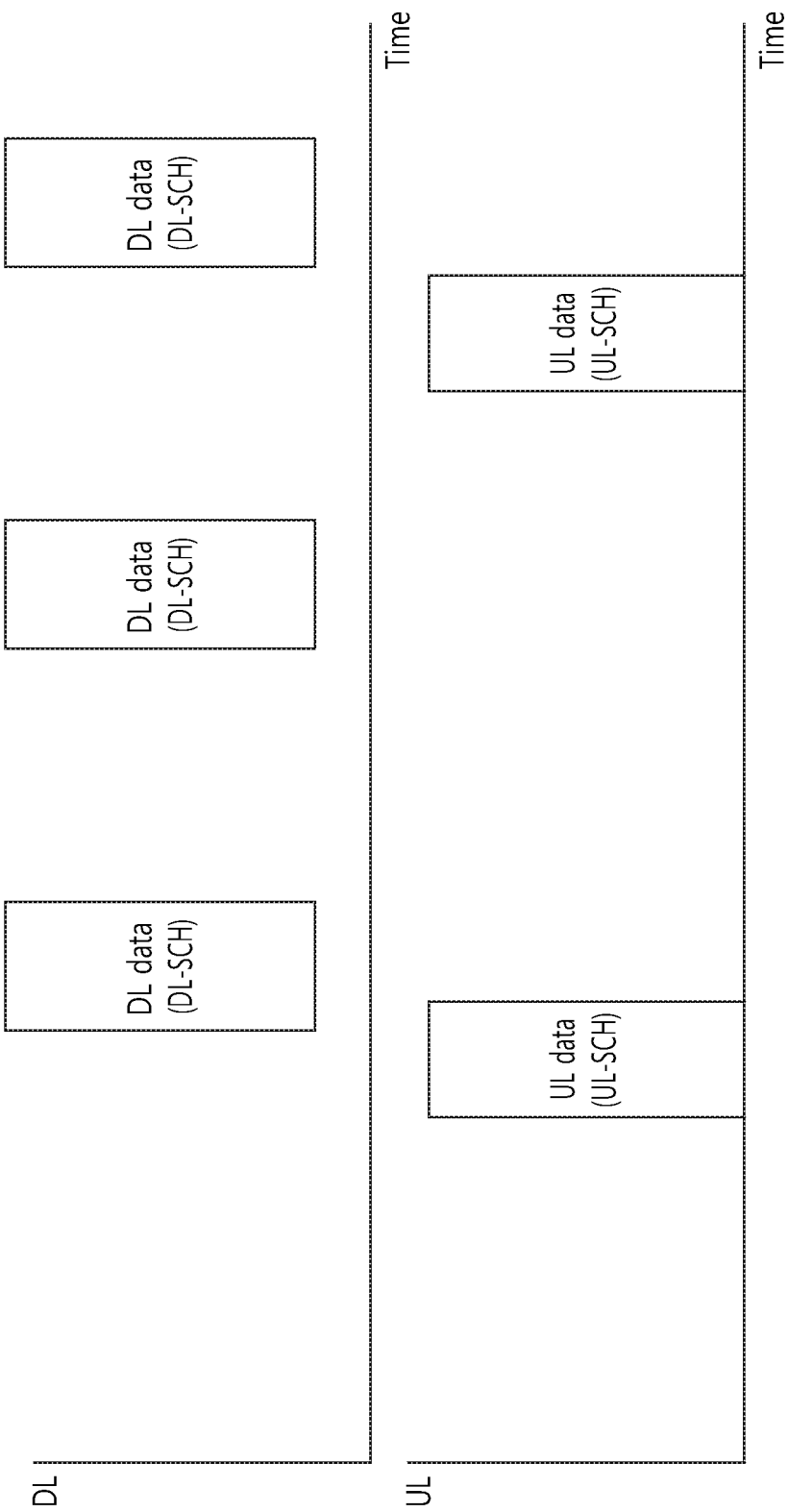
FIG. 6 is a drawing for explaining a semi-persistent scheduling (SPS) method.

FIG. 5 is a drawing for explaining a method of dynamically assigning a radio resource. FIG. 6 is a drawing for explaining an SPS method.

A typical process of transmitting data from a UE to an eNB (a method of dynamically assigning a radio resource) is described below with reference to FIG. 5. First, the UE may request the eNB to provide a radio resource required for transmission of generated data (S501). Therefore, the eNB may assign the radio resource through a control signal according to a radio resource request of the UE (S502). In an LTE system, the resource assignment of the eNB for transmitting UL data of the UE may be transmitted through a UL grant transmitted through a PDCCH. Therefore, the UE may transmit data to the eNB through the assigned radio resource (S503). The radio resource request of the UE, the resource assignment of the eNB, and corresponding UL data transmission of the UE may be optionally repeated (S508 to S510).

Meanwhile, when the eNB transmits downlink (DL) data to the UE, a DL assignment message may be transmitted to the UE through the PDCCH to know through which radio resource the data transmitted to the UE is transmitted (S504), and the eNB may transmit data to the UE through a radio resource corresponding to the DL assignment message (S505). In this case, DL assignment information transmission and DL data transmission through a radio resource corresponding thereto may be achieved in the same transmission time interval (TTI). Further, as shown in FIG. 5, the DL data transmission procedure may be repeated.

A method of assigning an SPS radio resource is a method in which first and second steps are skipped in three steps for transmitting data to the eNB (i.e., (1) the resource request of the UE, (2) the resource assignment of the eNB, and (3) the data transmission of the UE according to the resource assignment). Accordingly, the UE may perform a process of transmitting data directly without the aforementioned first and second steps, i.e., the step of requesting the radio resource and the step of assigning the radio resource, on the basis of a configuration of the radio resource. The concept of the SPS method is shown in FIG. 6. That is, in the SPS method, the eNB does not have to transmit radio resource assignment information all the time through the PDCCH.

Figure 7:
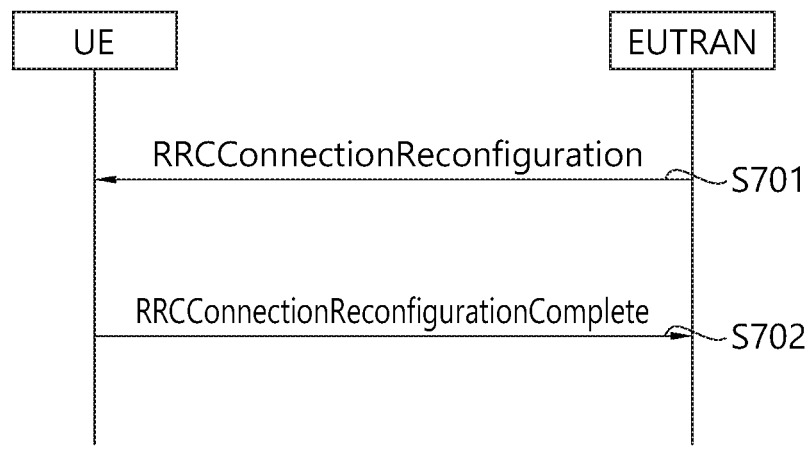
FIG. 7 is a drawing showing an RRC signaling flow between a UE and an eNB for an SPS configuration.
Figure 8:
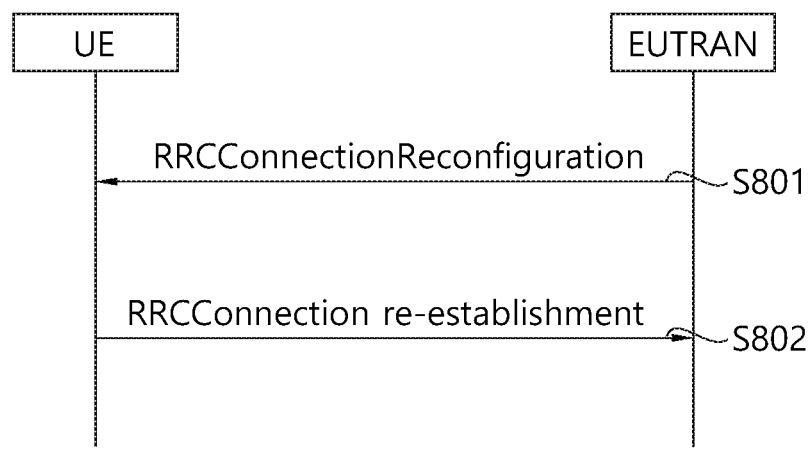
FIG. 8 is a drawing showing an RRC signaling flow between a UE and an eNB for an SPS configuration.

FIG. 7 and FIG. 8 are drawing showing an RRC signaling flow between a UE and an eNB for an SPS configuration.

More specifically, FIG. 7 is a drawing showing a case where a radio resource control (RRC) connection is successfully set up between the eNB and the UE, and FIG. 8 is a drawing showing a case where an RRC connection is not successfully set up between the eNB and the UE.

First, the eNB may transmit an RRC connection reconfiguration message to the UE through RRC signaling (S701, S801). The RRC connection reconfiguration message may include a radio resource configuration information element (IE), more specifically, radioResourceConfigDedicated, and the radio resource configuration IE may include an SPS configuration IE (sps-Config IE). The SPS configuration ID may include basic information regarding the SPS configuration such as a radio resource assignment period or the like for the SPS. Upon receiving the information, if the UE successfully sets up the RRC connection, an RRC connection reconfiguration complete message may be transmitted to the eNB (S702). Unlike this, if the RRC connection is not successfully set up, a configuration between the eNB and the UE may be adjusted by exchanging the RRC connection re-establishment message (S802).

Hereinafter, connectionless transmission will be described.

In a 3GPP LTE system, a UE in an idle state must perform an RRC connection setup and a data connection setup before data transmission is performed. This means that both of a logical connection (RRC connection) between an eNB and the UE and a logical connection (S1 connection/interface, EPS connection) between a mobility management entity (MME) and the UE are set up.

Figure 9:
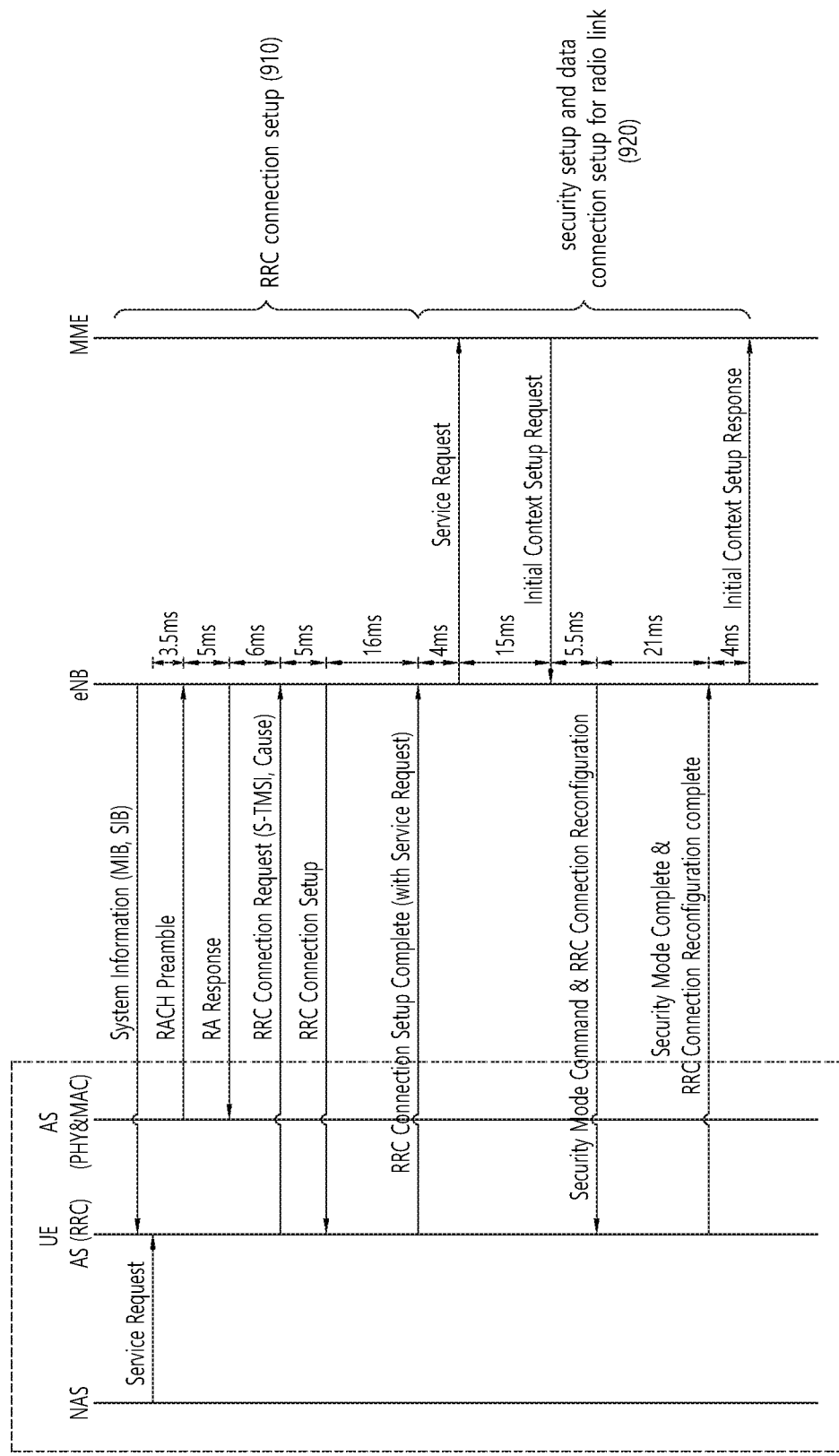
FIG. 9 shows a connection setup procedure and a required time in $3^{rd}$ generation partnership project (3GPP) long term evolution (LTE).

FIG. 9 shows a connection setup procedure and a required time in 3GPP LTE.

Referring to FIG. 9, a UE first performs an RRC connection setup (see 910) with an eNB before transmitting data. The UE receives system information such as a master information block (MIB) and a system information block (SIB) from the eNB. In addition, the UE transmits a random access preamble through an RACH resource, and receives a random access response in response thereto. Thereafter, the UE transmits an RRC connection request to the eNB, and receives an RRC connection setup message from the eNB. When the UE transmits an RRC connection setup complete message to the eNB, the RRC connection setup (see 910) may be performed.

When the RRC connection setup (see 910) is performed with respect to the eNB, the UE performs a security setup and data connection setup for a radio link (see 920) with respect to a mobility management entity (MME). The eNB transmits a service request to the MME, and the MME transmits an initial context setup request to the eNB. The eNB transmits security mode command and RRC connection reconfiguration messages to the UE. The UE transmits security mode complete and RRC connection reconfiguration complete messages to the eNB. Thereafter, the eNB transmits an initial context setup request to the MME. In doing so, the UE may perform the security setup and data connection setup for the radio link (see 920) with respect to the MME.

Since it takes 35.5 ms in total for the RRC connection setup (see 910) and it takes 49.5 ms in total for the security setup and data connection setup for the radio link (see 920), it takes 85 ms in total as a time for transitioning a connected state of the UE in the idle state.

If it is intended to transmit UL data after transitioning the connected state of the UE, the UE must undergo a step of transmitting a scheduling request to the eNB. A procedure of transmitting the UL data and a delay caused thereby are described below with reference to FIG. 10 and FIG. 11.

Figure 10:
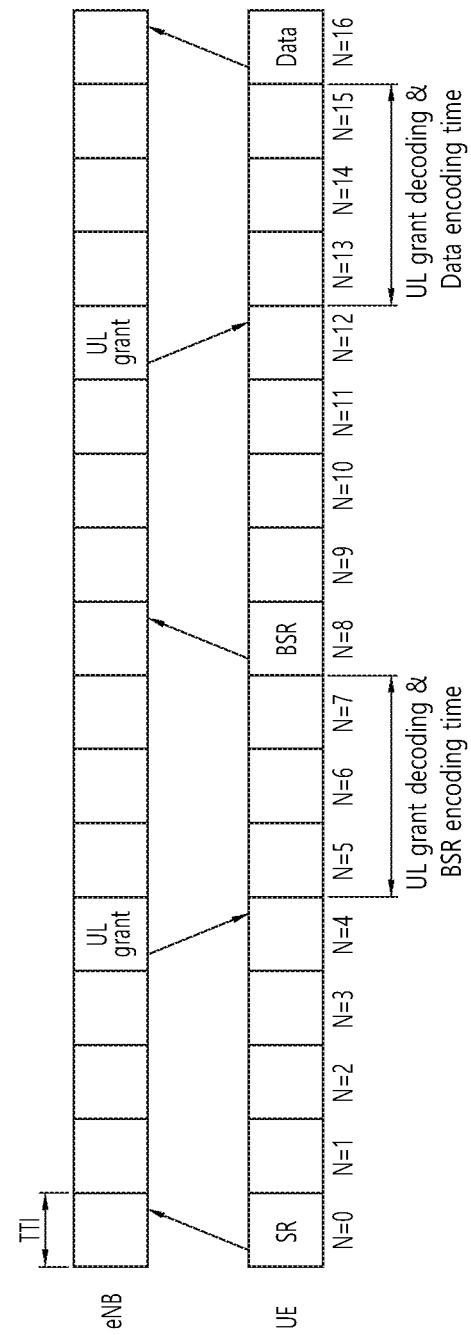
FIG. 10 shows a required time in a method of assigning an uplink resource through a scheduling request in 3GPP LTE.

FIG. 10 shows a required time in a method of assigning a UL resource through a scheduling request in 3GPP LTE.

Referring to FIG. 10, a UE transmits a scheduling request (SR) to an eNB, and the eNB transmits a UL grant to the UE. The UE decodes the UL grant during a specific duration, and encodes a buffer status report (BSR). Thereafter, the UE transmits the encoded BSR to the eNB, the eNB transmits the UL grant to the UE, and the UE transmits data to the eNB according to the UL grant. The method of assigning the UL resource through the SR may generate a delay of 9.5 ms in total.

Figure 11:
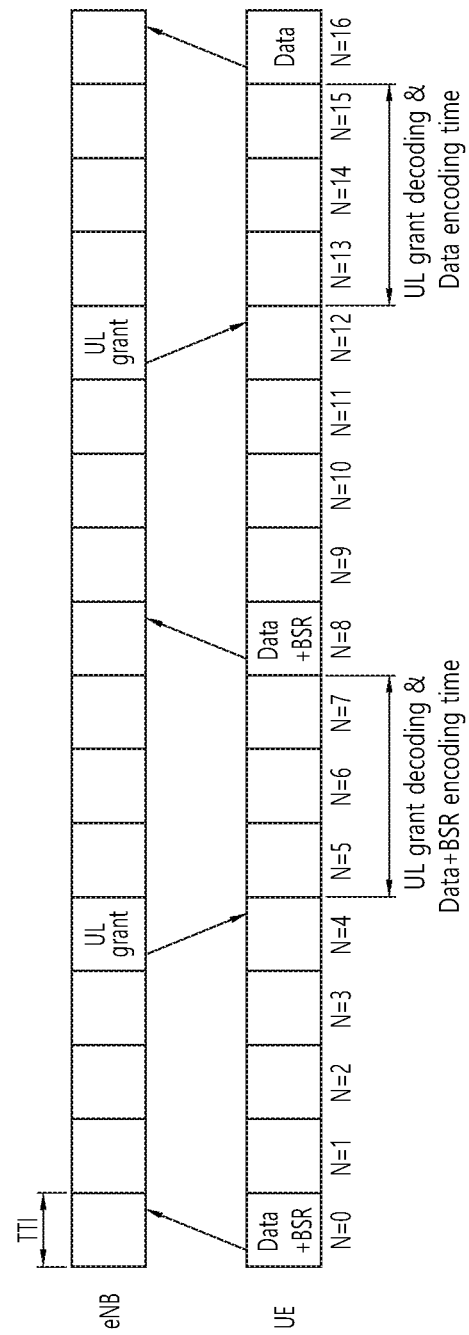
FIG. 11 shows a required time in a method of assigning an uplink resource through a scheduling request (SR) and a buffer status report (BSR) in 3GPP LTE.

FIG. 11 shows a required time in a method of assigning a UL resource through a scheduling request (SR) and a buffer status report (BSR) in 3GPP LTE.

Referring to FIG. 11, a UE transmits data and a BSR to an eNB, and the BS transmits a UL grant to the UE. The UE decodes the UL grant during a specific duration, and encodes the data and the BSR. Thereafter, the UE transmits the encoded data and BSR to the eNB, the eNB transmits the UL grant to the UE, and the UE transmits data to the eNB according to the UL grant. The method of assigning the UL resource through the SR and the BSR of the UE may generate a delay of 17.5 ms in total.

That is, it may take 9.5 ms to 17.5 ms in total as a time of occupying a radio resource and transmitting data by a UE which has transitioned to a connected state. Since it takes 85 ms in total as a time required for the UE in the idle state to transition to the connected state, it may take 94 ms to 102.5 ms in total as a time required for the UE in the idle state to transmit data. Accordingly, a connectionless transmission method may be considered to decrease a delay time depending on the transitioning of the connected state of the UE.

In general, when there is no data to be transmitted, the UE transitions to a discontinuous reception mode or an idle state to achieve power saving or to decrease a network overhead. In the discontinuous reception mode in which a connection set up with the eNB is maintained, a handover is performed when the UE moves between the eNBs. However, in a situation where too many UEs are connected to a single eNB and all UEs are moving UEs, there is a disadvantage in that a signaling overhead is increased in a radio duration for performing the handover. Further, there is a disadvantage in that the UE has to perform the handover frequently when a communication eNB having a small coverage such as a road side unit is installed. Therefore, the connectionless transmission method may be used to decrease the signaling overhead in the radio duration caused by the handover.

Herein, the SPS may be applied to both of a case where the UE is in a connected state and a case where the UE is in a disconnected (or non-connected) state. However, when the UE is in the disconnected state, reducing influence that is caused by an inconsistency in the uplink synchronization by emptying (puncturing) part of the SPS resources is needed to be performed. More specifically, in order to eliminate interference on an adjacent symbol and an adjacent subcarrier that caused by an inconsistency in the uplink synchronization, among the SPS resource block, part of the resources is emptied. In case the coverage of a Road Side Unit (RSU) is small, since the inconsistency in the time synchronization (sync) of the uplink is shorter (or smaller) than a length of a Cyclic Prefix (CP) duration, the inconsistency may be disregarded (or ignored). However, in case the inconsistency in the time synchronization is longer (or larger) than the CP, it is needed to prevent signals that precede and follow one another from overlapping one another by emptying part of the resources. Additionally, due to the inconsistency in the uplink synchronization, the signal that is transmitted from the UE may generate an out of band emission to the signals located above and below the corresponding signal. In order to reduce the influence caused by the out of band emission, the upper subcarrier and the lower subcarrier remain empty (or vacant) without transmitting any signals.

In services provided in automobiles, drones, and so on, when an urgent signal is generated, such as a collision warning, the corresponding signal needs to be quickly delivered (or transmitted) to a neighboring (or adjacent) UE within 10 ms-100 ms. In order to do so, it may be preferable to assign (or allocate) resources that are dedicated to scheduling requests to all UEs. However, when considering the number of automobiles travelling on the roads, there lies a disadvantage in that an excessive number of resources may be wasted for the purpose of scheduling requests.

In order to efficiently ensure scheduling request resources, data transmission resources of IoT devices (or UEs), such as automobiles and drones, which periodically update signals, should be used for the purpose of scheduling requests. When applying the above-described technique to a UE that is in a disconnected transmission state, when the UE being in the disconnected transmission state transmits an uplink signal, the corresponding UE may transmit a scheduling request without using the legacy (or conventional) random access resource. More specifically, in case of performing a disconnected transmission by using a random access procedure, although there may always exist a risk of collision between preambles or transmission signals, when using the above-described technique, it will also be advantageous in that the UE may be capable of performing scheduling request without any risk of collision.

However, in case a cycle period (or interval) of data resources being allocated by using semi-persistent scheduling is longer than a cycle period of a scheduling request required by a service, additional scheduling request resources are needed. Therefore, the development of a technology for such cases is needed.

This specification proposes a method for performing a scheduling request by using uplink data transmission resources that are allocated by using a semi-persistent scheduling (SPS) method (or technique). The purpose of this specification is to use a smaller amount of scheduling request resources of a control channel while satisfying the delay (or latency) request condition.

<Proposed Technique 1>

A base station performs semi-persistent scheduling of resources for uplink data transmission to a UE via L2/L3 signaling. This is referred to as an SPS resource. At this point, among the SPS resources, part of the resources is assigned as resource for scheduling request. Data that are transmitted by a UE in the SPS resource correspond to signals having a comparatively low level of importance, such as position information. However, the scheduling request may correspond to signals having a high level of importance for urgent high-reliability communication. Thus, in a wireless communication system, the UE performs a scheduling request within an uplink data resource by using the SPS method and may then be capable of performing low latency high reliability communication.

However, the SR resource that is used in this specification corresponds to a resource for a scheduling request that is allocated within a control channel (e.g., PUCCH) and not to a resource for a scheduling request that is allocated within a SPS resource. Hereinafter, the SR resource will be described while being regarded as a general scheduling request resource.

Herein, a case where the SR resource is allocated to the UE at a cycle period (or interval) of T1 and the (uplink) SPS resource is allocated to the UE at a cycle period (or interval) of T2 will be assumed. Since the scheduling request can be performed in the SPS resource, it will be regarded that the SR resource is not allocated to a subframe having a SPS resource allocated thereto as well as N_1 number of subframes preceding the corresponding subframe and N_2 number of subframes following the corresponding subframe. Herein, each of N_1 and N_2 is assigned with an integer value that is equal to or greater than 0.

For example, in case an index of the subframe being allocated with the SPS resource corresponds to S, it will be regarded that the SR resource will not be allocated to subframes starting from Subframe S−(N_1) to Subframe S+(N_2). Herein, a subframe corresponds to a unit for allocating SR resources and SPS resources, and the subframe may also be expressed by using other terms, such as a slot, a frame, or a resource block. More specifically, a specific UE may perform a scheduling request through a SR resource of the control channel at a cycle period of T1 (or interval T1). And, if the UE is capable of performing a scheduling request through a SPS resource being allocated at a cycle period of T2 (or interval T2), the specific UE may not use the SR resource being allocated at the cycle period of T1.

More specifically, the base station performs hopping of logical resources for scheduling request that are allocated to the UE at each interval T1. The base station transmits hopping information (change information) to the UE via L2/L3 signaling.

Assumed herein is a case where the SR resource is allocated at a cycle period of T1, and where the SPS resource for the uplink data is allocated at a cycle period of T2=M*T1. When the SPS resource is used, since the SR resource may not be allocated for each T2, the number of scheduling request resources needed for each T2 is reduced from M*T1 to (M−1)*T1. Accordingly, resource utilization that is needed for performing the scheduling request becomes a multiple of M/(M−1). Additionally, although the SR resource is generated at an interval of T2, in order to create a new scheduling resource of the T1 interval by using a SR resource having a different start point, the SR resource should be hopped at each T1.

Logical resources for a scheduling request being allocated to the UE are processed with cyclic shift (or cyclically shifted) at a cycle period of T1. The base station delivers information indicating the size of a logical resource group that is cyclically shifted and a cyclic shift index to the UE by using L1 or L2/L3 signals. Additionally, a physical position of a logical resource group for the scheduling request is designated by using L1 or L2/L3 signals.

Figure 12:
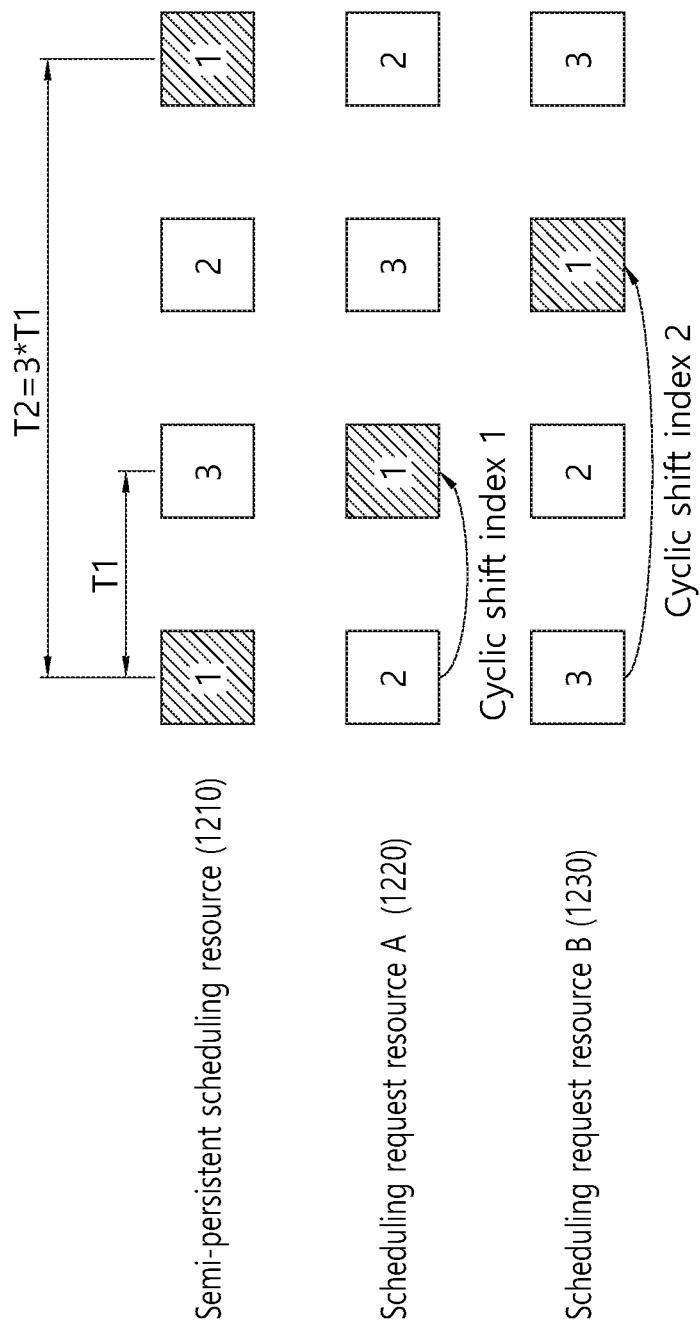
FIG. 12 is a drawing showing an exemplary cyclic shift of a logical resource for a scheduling request according to an exemplary embodiment of this specification.

FIG. 12 is a drawing showing an exemplary cyclic shift of a logical resource for a scheduling request according to an exemplary embodiment of this specification.

For example, in case M=3, the SR resource may be cyclically shifted as shown in FIG. 12. The numbers shown in FIG. 12 indicates the ID of the UE. In FIG. 12, a total of two SR resources (1220, 1230) exist, and three UEs perform cyclic shift at each cycle period of T1 so as to be allocated with the SR resources (1220, 1230). Among the three UEs, the UE that is not allocated with a SR resource corresponds to one of the UEs that are allocated with an SPS resource (1210) for uplink data within a range of N_1+N_2+1 number of subframes.

FIG. 12 shows an example of three UEs each being assigned with a UE ID corresponding to 1, 2, and 3 receiving information indicating that the size of a logical request group (including SR resource A and SR resource B), which is cyclically shifted, is equal to 2. Additionally, FIG. 12 shows an example of the UE receiving information indicating that the cyclic shift index for the SR resource A (1220) corresponds to 1 and information indicating that the cyclic shift index for the SR resource B (1230) corresponds to 2. The size of the logical resource group being cyclically shifted and the values of the cyclic shift index are merely exemplary, and, therefore, this specification will not be limited only to this. Accordingly, such information may be set to have other diverse values in accordance with the communication environment.

The above-described technique (or method) may be generalized and described as presented below. When T2=M*T1, M number of UEs may be cyclically shifted so as to be allocated with M−1 number of SR resources. Additionally, a UE being positioned in a subframe that is nearest to the SPS resource at each cycle period of T1 is not allocated with the SR resource.

Additionally, the physical positions of the M−1 number of SR resources are configured within N_1+N_2+1 number of subframes. Herein, M is an integer equal to or greater than 1, and each of N_1 and N_2 is an integer equal to or greater than 0. More specifically, a time interval according to the physical positions of SR resource A (1220) and SR resource B (1230) is configured within N_1+N_2+1 number of subframes.

However, in case both N_1 and N_2 are equal to 0, the physical positions of SR resource A (1220) and SR resource B (1230) may each be positioned in different subcarriers within the same subframe. As another example, in case N_1+N_2+1=M−1, the physical positions of the logical resources for the scheduling request may each be positioned in different subframes (the logical resources may be allocated at a one-to-one correspondence).

Additionally, the base station transmits a cyclic shift index of the SR resource to the UE. The UE that has received the corresponding cyclic shift index infers the value of M by using the values of T2 and T1 and then applies the cyclic shift index of the SR resource. For example, the UE may obtain the M value by using M=ceil(T2/T1). Also, the cyclic shift index of the SR resource indicates the position of a SR resource that is transmitted for the first time after a subframe to which an SPS resource being allocated to the UE belongs.

Additionally, the base station notifies a deactivation or activation of an SPS resource to the UE via L1 or L2/L3 signaling. Since a situation requiring the SPS resource to be quickly released (or cancelled) by using the deactivation indicator may exist, the base station may dynamically transmit the deactivation indicator via L1 signaling. For example, the deactivation indicator that is received via L1 signaling may be used for releasing the SPS resource only in the subframe that has received the deactivation indicator, and the deactivation indicator that is received via L2/L3 signaling may be used for the purpose of permanently (or persistently) releasing the SPS resource. As another example, when a deactivation indicator is received via L1 signaling, a case where the SPS resource is permanently released may also exist.

Moreover, in addition to the deactivation indicator, the base station indicates the SR resource that is to be used when deactivating the SPS resource to the UE. The SR resource that is allocated as described above is valid only during a deactivation duration (or period) of the SPS resource.

When the SPS resource for the uplink data transmission is deactivated, the UE becomes incapable of transmitting a scheduling request from the SPS resource. In order to compensate for such incapability, the base station needs to indicate a SR resource that is to be temporarily used.

The SR resource that is allocated by the base station to the UE may correspond to a SR resource that has already been allocated to another UE and not to a dedicated resource. In this case, the base station may indicate only a single SR resource to the UE, or the base station may indicate multiple SR resources. In case the UE is allocated with a plurality of SR resources, the UE may randomly select one resource and may then perform the scheduling request. The corresponding operation of the base station will hereinafter be described in detail.

In case a UE having its SPS resource deactivated (or not activated) intends to perform a scheduling request, the UE randomly selects one SR resource, among M−1 number of SR resources, and then performs the scheduling request.

Since the base station is aware of the UE having its SPS resource deactivated, the base station that has received the scheduling request also transmits a response to the scheduling request to the deactivated UE. The scheduling response that is intended to be sent to the deactivated UE may be transmitted from the same subframe as the initial scheduling request or may be sequentially transmitted.

More specifically, the base station that has received the scheduling request is incapable of knowing whether the scheduling request corresponds to a scheduling request made by a UE being initially allocated with a dedicated SR resource or whether the scheduling request corresponds to a scheduling request made by a UE having a deactivated SPS resource. Therefore, the scheduling response signal should be transmitted to both UEs. However, since the likelihood of the scheduling request being transmitted from the UE that is initially allocated with a dedicated SR resource by using the corresponding resource is higher, the base station first transmits the scheduling response to the UE being initially allocated with a dedicated SR resource. Then, if the base station does not receive any response, the base station may then transmit a scheduling response signal to the UE having its SPS resource deactivated.

Furthermore, in addition to the information on the deactivation indicator, the base station may notify (or inform) a cyclic shift index within the SR resource group and the application time information P to the UE at an interval of T2. If the UE receives the application time information in subframe t, the UE may newly apply a cyclic shift index after subframe P starting from subframe t.

<Proposed Technique 2>

The SR resource of the Proposed Technique 1 may be replaced with a random access resource. Herein, however, since the random access resource corresponds to a resource being commonly shared by UEs existing in a cell, the base station is required to allocate a position of the SPS resource in accordance with the position of the random access resource.

Since a UE being in a disconnected state (or disconnected UE) does not belong to a specific base station, such UE does not generally possess any SR resource. Instead, in case of a UE being in a disconnected state and having uplink data generated therein, by transmitting a preamble from the random access resource, a procedure for the uplink data transmission is initiated. However, since the random access resource exists for each X number of subframes, the UE should wait for X/2 number of subframes on average in order to perform the random access. If a disconnected UE possesses a SPS resource, since the UE is capable of performing the scheduling request by using the corresponding SPS resource, the Proposed Technique 1 may be used when positioning the SPS resource and the random access resource of the disconnected UE.

It will be assumed that base stations that are capable of performing semi-persistent scheduling in a disconnected state correspond to Base station 1, Base station 2, . . . , Base station N. When it is given that the random access resource of Base station 1 is positioned in the foremost subframe and that the random access resource of Base station N is positioned in the hindmost subframe, the interval between the random access resource of Base station 1 and the random access resource of Base station N should be configured to be equal to or less than A number of subframes. Herein, A is an integer that is equal to or greater than 0. It is advantageous in that, when the random access resource is positioned in a subframe, which is indicated by similar subframe indexes, it will be easier for the base stations to allocate the SPS resources by considering the scheduling request cycle.

Additionally, subcarriers allocating the random access resource in accordance with the cell ID may also be changed so that neighboring (or adjacent) base stations can configure the random access resource in different resources while maintaining the subframe interval to A number of subframes or less.

Figure 13:
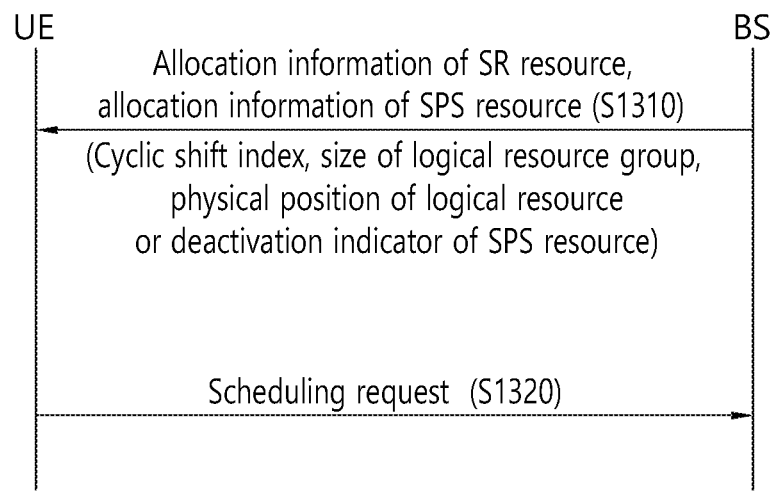
FIG. 13 is a drawing showing an example of transmitting a scheduling request through a SR resource or a SPS resource according to an exemplary embodiment of this specification.

In order to facilitate the understanding of the above-described exemplary embodiment, a procedure for transmitting a scheduling request through a SR resource or SPS resource will be shown in FIG. 13.

FIG. 13 is a drawing showing an example of transmitting a scheduling request through a SR resource or a SPS resource according to an exemplary embodiment of this specification.

The user equipment (UE) receives allocation information of the SR resource and allocation information of the SPS resource from the base station (BS) (S1310). The base station allocates the SR resource, which is allocated within the control channel, to the UE at a cycle period of T1 via L1 or L2/L3 signaling. The base station allocates the SPS resources for the uplink data transmission to the UE at a cycle period of T2 via L1 or L2/L3 signaling, and, among the SPS resources, the UE allocates part of the SPS resources as resources for scheduling request. More specifically, the UE may perform a scheduling request through the SR resource of the control channel at a cycle period of T1. And, if the UE transmits a scheduling request through a SPS resource, which is allocated at a cycle period of T2, the UE may not use the SR resource, which is allocated at a cycle period of T1.

However, the SR resource and the SPS resource may correspond to logical resources and not physical resources. Therefore, the SR resource is hopped at a cycle period of T1 in a logical resource level, and the SPS resource is hopped at a cycle period of T2 in a logical resource level. In this aspect, it may be understood that the base station transmits hopping information (change information) to the UE via L1 or L2/L3 signaling.

Additionally, the base station may deliver the size of a cyclically shifting logical resource group and a cyclic shift index to the UE via L1 or L2/L3 signaling. Thus, the SR resource being allocated to the UE may be cyclically shifted at a cycle period of T1. Additionally, the base station may designate the physical position of the cyclically shifting logical resource group to the UE via L1 or L2/L3 signaling. Furthermore, the base station may notify the deactivation or activation of the SPS resource to the UE via L1 or L2/L3 signaling by using a deactivation indicator.

The UE transmits a scheduling request to the base station through the scheduled SR resource or SPS resource based on the previously received allocation information (S1320).

Thus, the UE may be capable of performing scheduling request that satisfies the high reliability low latency (or delay) condition by using all of the resources for the scheduling request within the SR resource and SPS resource of the control channel, even though a smaller amount of general SR resources is used as compared to the conventional method.

Figure 14:
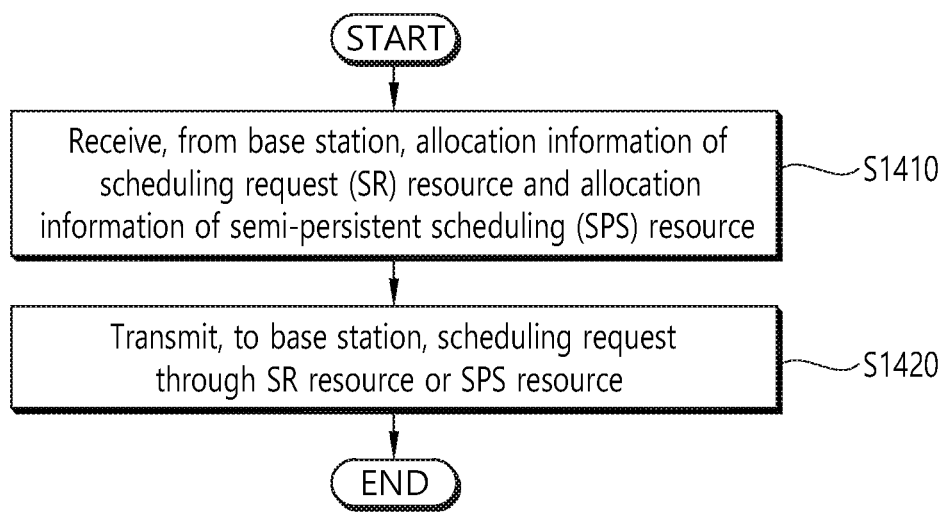
FIG. 14 is a flow chart showing a procedure for transmitting a scheduling request through a SR resource or a SPS resource according to an exemplary embodiment of this specification.

FIG. 14 is a flow chart showing a procedure for transmitting a scheduling request through a SR resource or a SPS resource according to an exemplary embodiment of this specification.

Firstly, the terms will be defined. A scheduling request (SR) resource may correspond to a resource for a scheduling request that is being allocated within a control channel (e.g., PUCCH). Although a semi-persistent scheduling (SPS) resource corresponds to a resource for transmitting uplink data, among the SPS resources, part of the resources may be allocated as resources for the scheduling request.

In step S1410, the UE receives allocation information of a scheduling request (SR) resource and allocation information of a semi-persistent scheduling (SPS) resource. At this point, the allocation information of the SR resource indicates that the SR resource is allocated at a first cycle period. And, the allocation information of the SPS resource indicates that the SPS resource is allocated at a second cycle period.

However, the SR resource and the SPS resource may correspond physical resources or logical resources. In light of the physical resource, if the scheduling request is transmitted through the SPS resource, based on the SPS resource, the SR resource is not allocated starting from a preceding predetermined subframe to a following predetermined subframe. A number of preceding predetermined subframes and a number of following predetermined subframes may be assigned with integer values being equal to or greater than 0. In other words, if the scheduling request is transmitted through the SPS resource, the scheduling request is not transmitted through a plurality of predetermined subframes including the SPS resource.

However, the first cycle period and the second cycle period may correspond to concepts that are applied to the logical resource. More specifically, the UE may receive a cyclic shift index from the base station. At this point, the SR resource may be cyclically shifted and allocated to the UE based on the cyclic shift index. Additionally, the UE may receive information on the size of the cyclically shifting logical resource group.

The cyclic shift index may be determined based on the position of a SR resource from which the scheduling request is transmitted for the first time since the SPS resource from which the scheduling request is transmitted.

For example, a case where the number of UEs being allocated with the scheduling request resources by the base station is equal to M may be assumed herein. At this point, the second cycle period may be equal to M times the first cycle period. The SR resource may be configured of M−1 number of logical resources. Additionally, the M−1 number of logical resources may be cyclically shifted so as to be allocated to M number of UEs based on the cyclic shift index. At this point, the value M may be an integer equal to or greater than 1.

Additionally, the UE may receive an indicator indicating the deactivation or activation of the SPS resource. If the indicator indicates the deactivation of the SPS resource, the UE may receive allocation information of the SR resource, which is to be used during a deactivation duration of the SPS resource, from the base station. The SR resource, which is allocated at this point, may correspond to a resource that is to be temporarily used by the UE and not to a dedicated resource, which is only used by a specific UE. In this case, the base station may allocate only a single SR resource to the UE, or the base station may allocate a plurality of SR resources to the UE. In case the UE is allocated with a plurality of SR resources, the UE performs the scheduling request by randomly selecting one resource. More specifically, the SR resource, which is to be used during the deactivation duration of the SPS resource, may correspond to one of the M−1 number of logical resources.

Additionally, the UE may receive application time information of the cyclic shift index from the base station at the second cycle period. In this case, the cyclic shift index may be applied starting from after the subframe that is indicated by the application time information.

Furthermore, the SR resource may be replaced with a random access resource. More specifically, the SR resource may be used to enable the UE to transmit a random access preamble. Since the random access resource is commonly shared by the UEs existing within the cell, the base station is required to allocate the position of the SPS resource in accordance with the position of the random access resource. Therefore, the SPs resource may be allocated based on the position of the SR resource and the first cycle period.

In step S1420, the UE may transmit a scheduling request to the base station through the SR resource or the SPS resource. More specifically, the UE may perform a scheduling request through the SR resource of the control channel at the first cycle period. And, if the UE transmits a scheduling request through the SPS resource, which is allocated at the second cycle period, the UE may not use the SR resource, which is allocated at the first cycle period.

Figure 15:
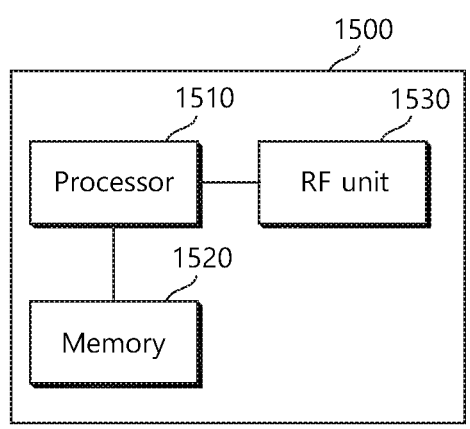
FIG. 15 is a block diagram showing an apparatus for wireless communication for implementing an embodiment of the present invention.

FIG. 15 is a block diagram showing an apparatus for wireless communication for implementing an embodiment of the present invention.

An apparatus (1500) for wireless communication includes a processor (1510), a memory (1520), and a radio frequency (RF) unit (1530).

The processor (1510) may be configured to implement proposed functions, procedures and/or methods described in this description. Layers of the radio interface protocol may be implemented in the processor (1510). The processor (1510) may handle a procedure explained above. The memory (1520) is operatively coupled with the processor (1510), and the RF unit (1530) is operatively coupled with the processor (1510).

The processor (1510) may include application-specific integrated circuit (ASIC), other chipset, logic circuit and/or data processing device. The memory (1520) may include read-only memory (ROM), random access memory (RAM), flash memory, memory card, storage medium and/or other storage device. The RF unit (1530) may include baseband circuitry to process radio frequency signals. When the embodiments are implemented in software, the techniques described herein can be implemented with modules (e.g., procedures, functions, and so on) that perform the functions described herein. The modules can be stored in the memory (1520) and executed by the processor (1510). The memory (1520) can be implemented within the processor (1510) or external to the processor (1510) in which case those can be communicatively coupled to the processor (1510) via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting a scheduling request by a user equipment (UE) in a wireless communication system, comprising:

receiving, from a base station, allocation information of a scheduling request (SR) resource and allocation information of a semi-persistent scheduling (SPS) resource;

receiving, from the base station, a cyclic shift index; and transmitting, to the base station, the scheduling request through the scheduling request resource or the semi-persistent scheduling resource, wherein the scheduling request resource is a resource for transmitting the scheduling request allocated in a control channel, wherein the semi-persistent scheduling resource is a resource for transmitting uplink data, a part of the semi-persistent scheduling resource being allocated for the scheduling request, wherein the scheduling request resource is cyclically shifted and allocated to the UE based on the cyclic shift index, and wherein the cyclic shift index is determined based on a position of the scheduling request resource through which the scheduling request is transmitted for a first time after the semi-persistent scheduling resource through which the scheduling request is transmitted.

2. The method of claim 1, wherein the allocation information of the scheduling request resource indicates allocation of the scheduling request resource being performed at a first cycle period, and wherein the allocation information of the semi-persistent scheduling resource indicates allocation of the semi-persistent scheduling resource being performed at a second cycle period.

3. The method of claim 2, wherein, if a number of UEs being allocated with scheduling request resources by the base station is equal to M, the second cycle period is equal to M times the first cycle period, wherein the scheduling request resource is configured of M−1 number of logical resources, wherein the M−1 number of logical resources is cyclically shifted so as to be allocated to M number of UEs based on the cyclic shift index, and wherein M is an integer equal to or greater than 1.

4. The method of claim 3, further comprising:

receiving, from the base station, an indicator indicating deactivation or activation of the semi-persistent scheduling resource;

if the indicator indicates deactivation of the semi-persistent scheduling resource, receiving, from the base station, allocation information of the scheduling request resource to be used during a deactivation duration of the semi-persistent scheduling resource; and receiving, from the base station, application time information of the cyclic shift index at the second cycle period, wherein a scheduling request resource to be used during a deactivation duration of the semi-persistent scheduling resource corresponds to one of the M−1 number of logical resources, and wherein the cyclic shift index is applied starting from after a subframe being indicated by the application time information.

5. The method of claim 2, wherein, if the scheduling request resource is used for transmitting a random access preamble of the UE, the semi-persistent scheduling resource is allocated based on a position of the scheduling request resource and the first cycle period.

6. A user equipment for transmitting a scheduling request in a wireless communication system,
a radio frequency (RF) unit transmitting and receiving radio signals; and
a processor being operatively connected to the RF unit, wherein the processor:
receives, from a base station, allocation information of a scheduling request (SR) resource and allocation information of a semi-persistent scheduling (SPS) resource,
receives, from the base station, a cyclic shift index, and
transmits, to the base station, the scheduling request through the scheduling request resource or the semi-persistent scheduling resource,
wherein the scheduling request resource is a resource for transmitting the scheduling request allocated in a control channel,
wherein the semi-persistent scheduling resource is a resource for transmitting uplink data, a part of the semi-persistent scheduling resource being allocated for the scheduling request,
wherein the scheduling request resource is cyclically shifted and allocated to the UE based on the cyclic shift index, and
wherein the cyclic shift index is determined based on a position of the scheduling request resource through which the scheduling request is transmitted for a first time after the semi-persistent scheduling resource through which the scheduling request is transmitted.

7. The user equipment of claim 6, wherein the allocation information of the scheduling request resource indicates allocation of the scheduling request resource being performed at a first cycle period, and
wherein the allocation information of the semi-persistent scheduling resource indicates allocation of the semi-persistent scheduling resource being performed at a second cycle period.

8. The user equipment of claim 7, wherein, if a number of UEs being allocated with scheduling request resources by the base station is equal to M, the second cycle period is equal to M times the first cycle period,
wherein the scheduling request resource is configured of M−1 number of logical resources,
wherein the M−1 number of logical resources is cyclically shifted so as to be allocated to M number of UEs based on the cyclic shift index, and
wherein M is an integer equal to or greater than 1.

9. The user equipment of claim 8, wherein the processor receives, from the base station, an indicator indicating deactivation or activation of the semi-persistent scheduling resource,
if the indicator indicates deactivation of the semi-persistent scheduling resource, receives, from the base station, allocation information of the scheduling request resource to be used during a deactivation duration of the semi-persistent scheduling resource, and
receives, from the base station, application time information of the cyclic shift index at the second cycle period,
wherein a scheduling request resource to be used during a deactivation duration of the semi-persistent scheduling resource corresponds to one of the M−1 number of logical resources, and
wherein the cyclic shift index is applied starting from after a subframe being indicated by the application time information.

10. The user equipment of claim 7, wherein, if the scheduling request resource is used for transmitting a random access preamble of the UE, the semi-persistent scheduling resource is allocated based on a position of the scheduling request resource and the first cycle period.

* * * * *